United States Patent

Salihi et al.

[15] 3,659,168

[45] Apr. 25, 1972

[54] VOLTAGE CONTROL FOR A MOTOR SUPPLY SYSTEM

[72] Inventors: Jalal T. Salihi, Birmingham; Daniel W. Shimer, Madison Heights, both of Mich.

[73] Assignee: General Motors Corporation, Detroit, Mich.

[22] Filed: Feb. 22, 1971

[21] Appl. No.: 117,498

[52] U.S. Cl. .............................. 318/227, 290/14, 318/230, 318/231, 321/5, 321/69 R
[51] Int. Cl. .......................................................... H02p 5/40
[58] Field of Search ............. 318/227, 230, 231; 321/5, 69 R; 290/14

[56] References Cited

UNITED STATES PATENTS

| | | | |
|---|---|---|---|
| 3,387,195 | 6/1968 | Piccand et al. | 318/227 |
| 3,568,022 | 3/1971 | Domann | 318/230 X |
| 3,584,276 | 6/1971 | Ringland et al. | 318/227 |

Primary Examiner—Gene Z. Rubinson
Attorney—E. W. Christen and C. R. Meland

[57] ABSTRACT

In this system, a controlled rectifier converter interconnects an alternating current voltage source with an AC induction motor. To effect voltage amplitude control, trigger signals are pulsed to the various controlled rectifiers of the converter during their respective 120° conductive intervals. The resultant duty cycle modulation affords control of the level of the voltage applied to the induction motor. At low frequencies, a plurality of power pulses are provided by the converter during each 60° of conduction, whereas at high frequencies, a single power pulse is supplied for each 60° of conduction. A smooth transition is provided between these two operating modes to ensure smooth, continuous motor control and operation throughout the operating range of the motor. This smooth transition is facilitated by synchronizing the power pulses in relation to the two 60° increments comprising the 120° conductive intervals for the respective controlled rectifiers.

9 Claims, 7 Drawing Figures

INVENTORS
Jalal T. Salihi &
BY Daniel W. Shimer

C. R. Meland
ATTORNEY

Patented April 25, 1972
3,659,168
3 Sheets-Sheet 2
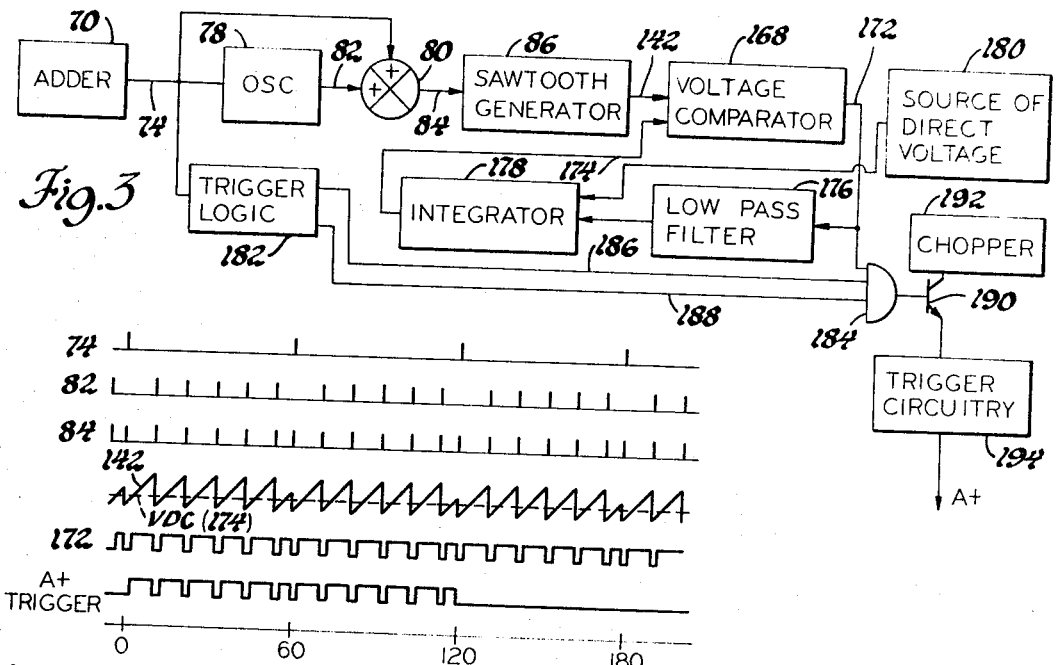
Fig.3
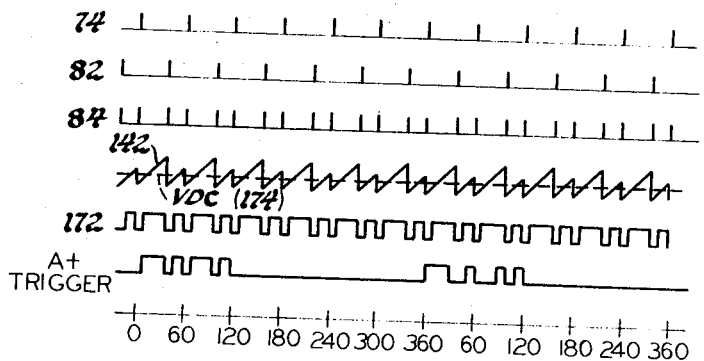
Fig.4A
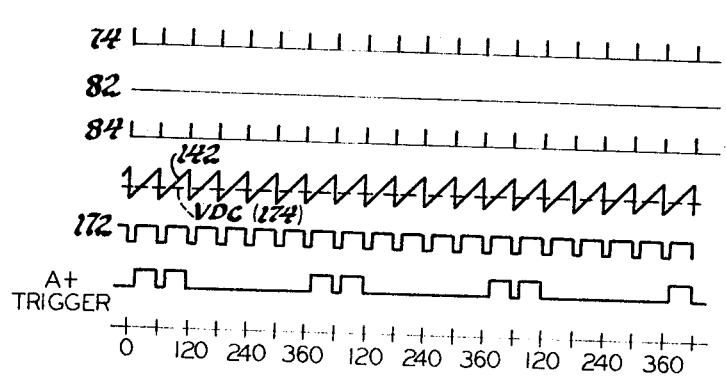
Fig.4B
Fig.4C
INVENTORS
Jalal J. Salihi &
BY Daniel W. Shimer
C. L. Meland
ATTORNEY

VOLTAGE CONTROL FOR A MOTOR SUPPLY SYSTEM

This invention relates to a converter for providing an AC output having controllable frequency from a DC or fixed frequency AC input wherein duty cycle modulation of converter controlled switches provides control of the output voltage level.

Converter arrangements are generally known in the art of motor speed control for supplying variable frequency power to drive AC induction motors. For example, inverters are generally known for motor control applications using DC power sources, and cycloconverters are known for use in motor control circuits to provide a controlled, variable frequency AC motor drive voltage from a fixed frequency AC source. In these known systems, the frequency of trigger signals gating the converter controlled switching devices conductive is controlled in a predetermined manner to effect the requisite frequency control. The controlled switches can take the form of controlled rectifiers, transistors or other controllable switching devices according to the requirements of the particular application. Voltage amplitude regulation is accomplished in these known systems by controlling the voltage level of the AC or DC power source input to the converter. Accordingly, control of the total operation of the motor is accomplished by control of the switching frequency and control of the input voltage.

The instant invention, by means of duty cycle modulation, affords voltage control without the necessity of controlling the input voltage to the inverter or cycloconverter. To accomplish the requisite duty cycle modulation, a sawtooth waveform is generated having a frequency related to the switching frequency of the converter. At low operating frequencies, this sawtooth waveform completes several cycles intermediate each pair of trigger signals, whereas at high frequencies, a single cycle of the sawtooth waveform is completed for each pair of trigger signals. The sawtooth waveform has a constant maximum amplitude independent of the instantaneous frequency of the sawtooth signal. A scheme of synchronization of the sawtooth voltage in relation to the trigger signals ensures a smooth transition between the low frequency and high frequency modes of operation.

Voltage control of the converter output is accomplished by comparing a reference DC voltage level with the sawtooth voltage waveform. In this manner, the system of the present invention develops a control signal to regulate conduction by converter controlled rectifiers during the intervals in which they otherwise would be provided gate trigger pulses. The normal trigger pulses to the controlled rectifiers are thus inhibited by inhibiting the operation of the trigger source when the reference DC and the sawtooth voltage have a first predetermined amplitude relationship; additionally, the trigger pulses are applied to the respective controlled rectifiers when the two voltages have a second predetermined amplitude relationship by enabling the trigger source at that time. For example, the controlled rectifier trigger source can be inhibited when the instantaneous amplitude of the sawtooth voltage is less than the reference DC signal and enabled when the instantaneous amplitude of the sawtooth waveform exceeds the DC reference. Accordingly, modulated trigger pulses are supplied the controlled rectifiers during their respective conductive intervals.

As is known in the art of motor control, during low frequency operation it is desirable to provide a plurality of power pulses to supply a motor from a converter rather than a single pulse followed by an extended period of nonconduction. Two considerations underlie the choice to distribute the single power pulse in the form of a plurality of shorter pulses: first, the resultant voltage has a lesser harmonic content and is, accordingly, a more efficient mode of operation; second, mechanical effects of torque pulsations are reduced and smoother operation obtains. The present invention contemplates optimum low speed operation consistent with the above criterion and high speed operation with a single power pulse intermediate each pair of gating signals with provision for a smooth transition between the modes.

It is an object of the present invention to provide a converter motor supply wherein voltage magnitude control is effected by duty cycle control of the conductive intervals of controlled switching devices in the converter.

It is another object of the present invention to provide a controlled rectifier converter interconnecting an alternating current source with an AC induction motor capable of controlled frequency operation wherein trigger pulses to the converter controlled rectifiers are periodically interrupted to regulate the magnitude of voltage supplied to the AC motor.

Another object of the present invention is to provide a controlled rectifier converter of the type described wherein duty cycle control is used to regulate voltage output and wherein a low frequency mode including a plurality of control pulses intermediate each pair of trigger signals and a high frequency mode having a single control pulse are provided.

Another object of the present invention is to provide a converter supply system for energizing an AC motor having low frequency and high frequency operating modes of the type described wherein a smooth transition between the modes of operation is accomplished by synchronizing the trigger pulses applied to the converter relative to the trigger signals defining 60 degree increments of converter operation in a manner permitting a continuous transition from the initiation of motor operation to the frequency preselected as defining the beginning of high frequency operation.

These and additional objects and advantages of the present invention will be apparent from the following description wherein the FIGS. listed below are incorporated as illustrating a preferred embodiment.

In the drawings:

FIG. 3 is a block diagram of gate firing trigger circuitry made in accordance with the present invention to develop the requisite enabling and disabling control to effect duty cycle modulation of the converter of FIG. 1.

Figures 1, 2:
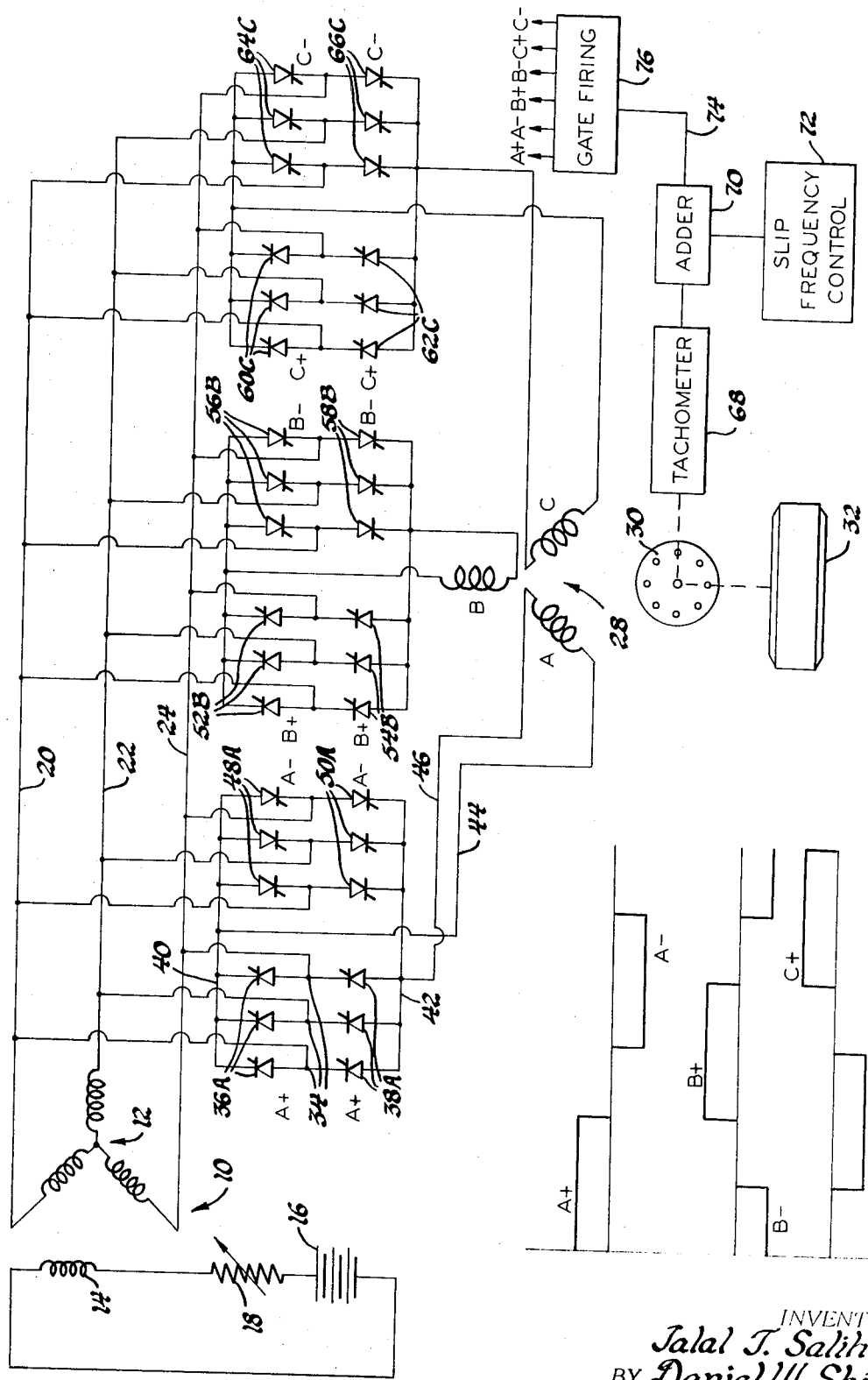
FIG. 1 is a schematic circuit diagram of a power supply system for an induction motor including a controlled rectifier converter.
FIG. 2 is a timing chart graphically depicting the voltages applied the induction motor phase windings of FIG. 1 during intervals of full voltage operation.

FIGS. 4A, 4B, and 4C are timing diagrams depicting the operation of the converter of FIG. 1 as controlled by the angle control or duty cycle modulation circuitry of FIG. 3.

Figure 5:
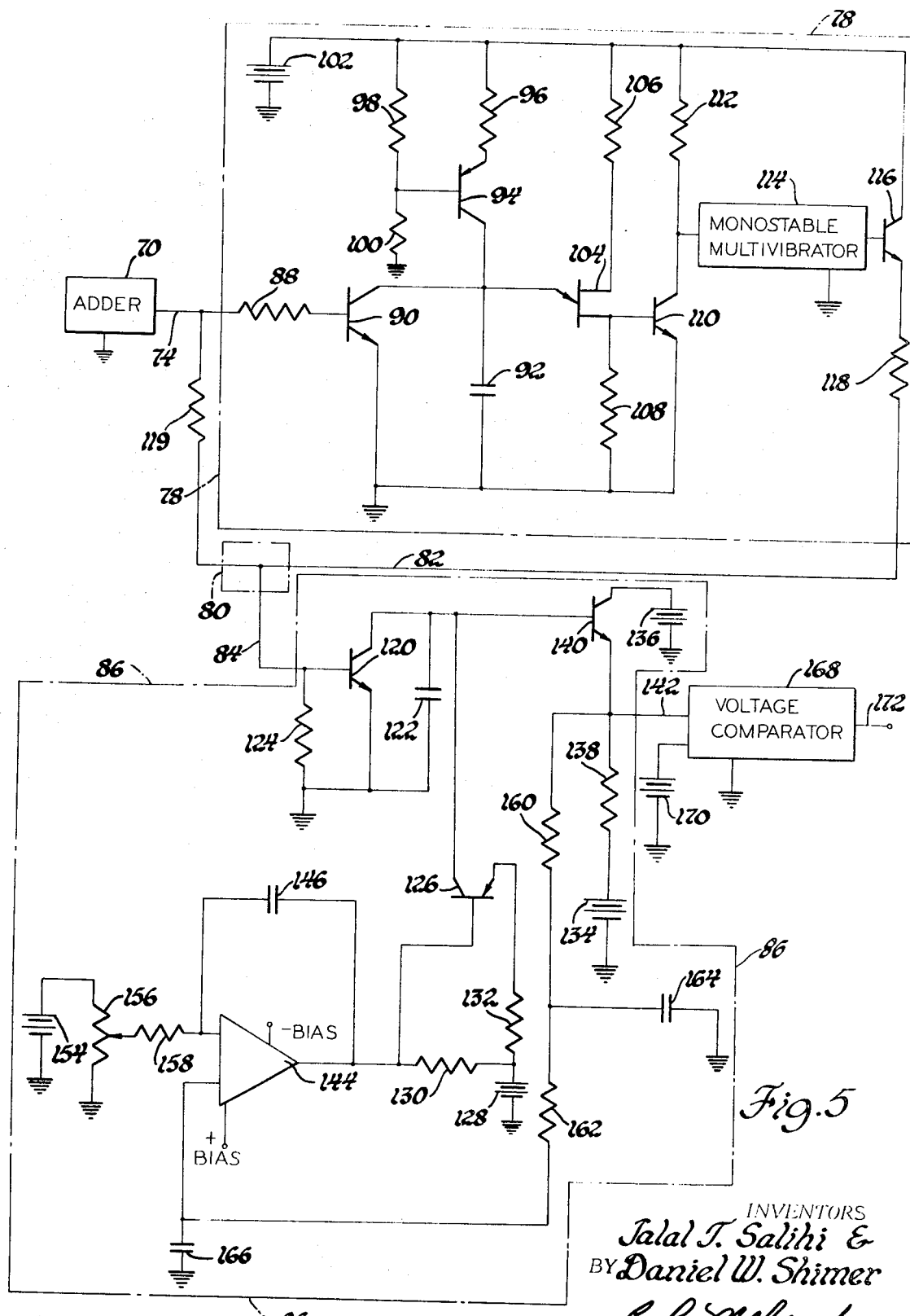

FIG. 5 is a detailed schematic of the oscillator and sawtooth generator control and synchronization scheme of the present invention.

Reference should now be made to the drawings and more particularly to FIG. 1 wherein an electric propulsion system for a vehicle is illustrated including a source of polyphase alternating current designated by reference numeral 10. This source of alternating current is a three-phase Y-connected generator having an output winding 12 and a field winding 14. Field winding 14 is serially connected with a source of direct current 16 through a variable resistor 18. Variable resistor 18 provides regulation of field current and concomitantly the generator output voltage. It should be appreciated that variable resistor 18 is merely illustrative of various field current control devices: in practice, it could take a variety of forms, for example, a transistor voltage regulator might be used.

One use for the system to be described is the electric propulsion of a vehicle such as an earth mover in which case field winding 14 would be carried by the generator rotor (not illustrated) and driven by a prime mover such as a turbine or diesel (not illustrated). It should be appreciated that the source of alternating current could be three-phase commercial power if the present invention were incorporated in a motor control system in a manufacturing facility.

Three power supply conductors 20, 22, and 24 provide an interconnection between the Y-connected winding 12 and the controlled rectifiers of the converter. These three conductors carry three-phase voltage having a frequency and amplitude determined by the operating conditions of the alternating current source 10. For purposes of the following discussion, the frequency and magnitude of the voltage on conductors 20, 22, and 24 are assumed to be constant.

In the earth mover application, the three-phase induction motor 28 having phase windings A, B, and C provides drive power for vehicle propulsion. In this situation, the squirrel cage rotor 30 is coupled with a vehicle wheel 32 to drive the vehicle. A mechanical differential or other coupling can be used between the rotor 30 and the vehicle wheel 32. Depending on the particular operating characteristics which are desired, each wheel can be driven by a separate motor or one motor can drive two wheels through a differential.

Six full wave bridge rectifying networks control the frequency of power supplied the phase windings A, B, and C from the source of alternating current 10. Three AC input terminals 34 are provided to a first full wave bridge comprised of three controlled rectifiers 36A and three controlled rectifiers 38A. The input terminals 34 are connected respectively with the three conductors 20, 22, and 24 of the drawing. This bridge rectifier network has direct current output terminals connected with conductors 40 and 42. It will be appreciated by those skilled in the art that a direct voltage is developed across conductors 40 and 42 when the six controlled rectifiers 36A and 38A are simultaneously gated conductive. This voltage has a positive polarity on conductor 40 and a negative polarity on conductor 42. Phase winding A is connected by conductors 44 and 46 with the direct current output of the full wave bridge and, accordingly, current will flow through the phase winding A from conductor 44 to conductor 46 when controlled rectifiers 36A and 38A are conductive. The voltage developed across phase winding A during the interval in which controlled rectifiers 36A and 38A are conductive is depicted in FIG. 2 and labeled A+.

A second three-phase full wave bridge rectifier comprised of three controlled rectifiers 48A and three controlled rectifiers 50A provides direct current of the opposite polarity of that described to phase winding A of the induction motor 28. When the six controlled rectifiers 48A and 50A are simultaneously gated conductive, conductor 42 provides a positive output with respect to conductor 40 such that a current flows through phase winding A from conductor 46 to conductor 44. The resultant voltage developed across phase winding A is depicted in FIG. 2 and there identified as A−. It should be appreciated that the conduction times for the two full wave bridge rectifiers described are nonoverlapping. The full wave bridge rectifiers carry additional indicia A+ and A− in the drawing of FIG. 1 to correlate them with the voltages developed, during their respective conductive intervals, across phase winding A and depicted in FIG. 2.

Four additional full wave bridge rectifiers are included in the circuit schematic of FIG. 1 to energize motor phase windings B and C in a manner analogous to that described for motor phase winding A. To supply phase winding B with current of a polarity to develop voltage B+ of FIG. 2, six controlled rectifiers 52B and 54B are simultaneously gated conductive. In a similar manner, voltage B− of FIG. 2 is developed across phase winding B when the six controlled rectifiers 56B and 58B are gated conductive. Controlled rectifiers 60C and 62C supply current to phase winding C having a polarity such that voltage C+ of FIG. 2 is developed across the phase winding. Finally, controlled rectifiers 64C and 66C supply phase winding C with current to develop voltage C− of FIG. 2 when these six controlled rectifiers are provided simultaneous gate signals.

It is noted that the voltages developed across the various phase windings as depicted in FIG. 2 have a theoretical waveform ignoring ripple and delay on shut off. It should also be appreciated that the operation as described assumes full application of the voltage available from the source 10 for the entire 120° conductive intervals of the various full wave bridge rectifiers. The modification of this conduction necessary to accomplish voltage amplitude control according to the present invention is set forth hereinafter in conjunction with FIGS. 3, 4A, 4B, and 4C.

Operation of the induction motor 28 obtains in accordance with the periodic and sequential switching of the six full wave bridge networks shown in the drawing. The operation is summarized graphically for one cycle in FIG. 2. At any given time, two phase windings are energized as shown in the diagrams of FIG. 2. One of the two phase windings is provided positive voltage, while the other is provided negative voltage. For example, from zero to 60°, phase windings A and B are simultaneously energized; A is energized with a positive voltage A+, and B is energized with a negative voltage B−. During this 60° interval, the twelve controlled rectifiers 36A, 38A, 56B, and 58B are conductive, and the remaining 24 controlled rectifiers are nonconductive.

The 36 controlled rectifier converter generally described above is of the nonsynchronized type inasmuch as no attempt is made to correlate the gating of controlled rectifier with any of the voltages of the output winding 12. It should be appreciated that the controlled rectifiers are gated periodically and sequentially in groups of six and that the gate pulses are randomly applied when compared with the voltage waveforms of the voltages on conductors 20, 22, and 24. Each controlled rectifier is maintained in the conductive state as long as a gate pulse is applied to it, and commutation is inherent after the gate pulse is removed when the AC voltage from the source 10 connected to the particular controlled rectifier falls below the level necessary to sustain conduction by the controlled rectifier.

Frequency control of the voltage applied to the induction motor 28 is effected by varying the switching frequency of the controlled rectifiers included in the various full wave bridges of the drawing. Voltage amplitude control is obtained by duty cycle modulation of the controlled rectifiers during their respective conductive intervals in a manner more fully discussed hereinafter. Thus, it should be appreciated that the assumption noted above relating to the constant frequency, constant amplitude character of the source 10 does not limit the control of the power supplied the induction motor 28 since both frequency and voltage are controllable by proper control of the converter controlled rectifiers.

The switching frequency of the controlled rectifiers can be regulated in accordance with several known control arrangements. Suitable control systems providing slip frequency control for induction motors are shown in detail in the U.S. Pat. Nos. to Salihi et al. 3,471,764 and to Agarwal et al. 3,323,032. In the system of the drawing of FIG. 1, slip frequency control is accomplished by a tachometer 68, an adder 70, and a slip frequency control 72. The tachometer 68 develops a voltage which is a function of the speed of the induction motor rotor 30. This tachometer 68 can take a variety of known forms including a generator providing a DC output or a pulse tachometer capable of developing a series of pulses having a frequency which is a function of rotor speed. The adder 70 is supplied an input from both the tachometer 68 and the slip frequency control 72.

In operation, the adder 70 provides an output signal correlated with the sum of the input signals from the tachometer 68 and the slip frequency control 72. It should be appreciated that manual or automatic regulation of the signal from slip frequency control 72 affords control of the slip frequency of the induction motor 28. Thus, the motor's performance characteristics as affected by the instantaneous slip frequency are controllable.

The adder 70 provides a pulse output connected by conductor 74 with a gate firing array 76. Trigger pulses for the various full wave bridge rectifiers are generated in response to the trigger signals from the adder 70. Specifically, each signal from the adder 70 causes a trigger pulse to be applied to the six controlled rectifiers of a particular full wave bridge. Proper sequencing of the trigger pulses is provided by logic in the gate firing array 76. Six output arrows are included in the drawing to represent the trigger pulses developed by the gate firing 76. Each of the arrows is identified by notation indicating the bridge rectifier controlled thereby, and it should be appreciated that a gate and cathode connection is required between each of the 36 controlled rectifiers and the gate firing in the control circuit.

A system for developing gate firing signals of the type required is completely described in copending application, Ser. No. 57,143, filed July 22, 1970, in the name of Jalal T. Salihi et al. and entitled "Controlled Rectifier Triggering System."

In the preferred embodiment, the system of copending application, Ser. No. 57,143 is used in conjunction with the voltage angle control or pulse modulation arrangement of the present invention. Accordingly, the operation of the trigger system of Ser. No. 57,143 insofar as pertinent to the present invention is summarized below.

In the controlled rectifier triggering system of Ser. No. 57,143, a logic array (not illustrated) provides periodic and sequential enabling signals to initiate group gating pulses for application to the six controlled rectifiers of the full wave bridge networks. To initiate a gate pulse for a particular group of controlled rectifiers comprising a full wave bridge, a high frequency chopper provides a pulsating input to the primary winding of a transformer when a transistor switch is biased conductive in response to a logic control signal. The transformer is provided six secondary windings, one each for the six controlled rectifiers of the bridge group. Each secondary of the transformer is connected with a rectifier network and the resultant DC gate pulse is applied through a trigger circuit to the controlled rectifier connected with the particular secondary winding. Thus, it should be appreciated that the six controlled rectifiers of each full wave bridge rectifier are gated when the transistor control element associated with the primary windings of the transformer connected with the controlled rectifiers of that full wave bridge is biased conductive. Inasmuch as this summary is adequate for an understanding of the present invention, the remaining details of the controlled rectifier triggering system are not set forth nor illustrated herein and reference should be made to copending application, Ser. No. 57,143 for the details of the entire circuit required.

For the following explanation, it is understood that the gate trigger signals available on the conductor 74 are spaced by 60° increments and provide the requisite control to the gate firing array 76 connected with the controlled rectifiers to produce the switching required to provide the voltage pattern of FIG. 2. Referring to FIG. 2, it should be appreciated that the trigger signals on conductor 74 occur at zero, 60°, 120°, 180°, 240°, 300°, 360°, etc. During application of full voltage to the phase windings A, B, and C, the voltage pattern of FIG. 2 obtains. The trigger pulses or signals from gate firing 76 required for the controlled rectifiers to develop this voltage pattern are provided in the manner set forth in the summary above. On the occurrence of each trigger signal on conductor 74, one control transistor is supplied a bias voltage and concurrently a second transistor is rendered nonconductive as the bias voltage connected with it is removed. The control transistor which is switched nonconductive will have been conductive for 120°. This pattern of control continues and the voltages of the graph of FIG. 2 are developed and applied to the motor according to the bias sequence and timing for the six control transistors.

Reference should now be made to FIG. 3 wherein a block diagram of the gate firing array 76 of FIG. 1 is shown including the control necessary to obtain voltage control by pulse modulation of the controlled rectifiers during their respective conductive intervals. As noted above, the adder 70 provides pulses spaced by 60°. These pulses are applied to the input of an oscillator 78 and directly to a pulse summer 80. Oscillator 78 provides a pulse output intermediate each pair of pulses from the adder 70 at a constant, fixed frequency; the oscillator 78 is disabled when the frequency of the pulses from the adder 70 on conductor 74 exceeds the fixed frequency of the oscillator 78. The constant frequency pulse output from oscillator 78 is connected with the summer 80 on line 82 and the combined output on line 84 from the summer 80 is supplied to a sawtooth generator 86. In the timing diagrams of FIGS. 4A, 4B, and 4C, the pulses from the adder 70 are labeled 74, the pulses from oscillator 78 are labeled 82, and the combined output from the summer 80 is labeled 84. These indices in FIGS. 4A, 4B, and 4C are the same as the reference numerals of the conductors carrying the pulses in the drawing of FIG. 3. It should be appreciated that the pulse train 84 is the summation of the pulses in the two trains 74 and 82. In FIG. 4C, the frequency of the pulses of the pulse train 74 exceeds the constant frequency of the oscillator 78, and accordingly, there are no pulses shown for the output conductor 82. Thus, the pulse train 84 is identically the same as the pulse train 74 in FIG. 4C.

Reference should now be made to FIG. 5 wherein a detailed circuit schematic of the oscillator 78 and the sawtooth generator 86 is shown. The following description of the operation of the oscillator and generator is directed to the circuitry shown; however, it should be appreciated that a variety of alternative circuit configurations would suffice in the control arrangement.

In FIG. 5, the pulses from the adder 70 on conductor 74 are connected through a resistor 88 with the base electrode of a transistor 90. A capacitor 92 is connected across the emitter and collector electrodes of the transistor 90, and a second transistor 94 together with the resistors 96, 98, and 100 comprises a constant current charging source for the capacitor 92. A source of direct voltage shown as a battery 102 provides voltage and current for the oscillator circuitry.

In operation, each pulse on conductor 74 coupled to the base electrode of transistor 90 biases that transistor conductive to discharge voltage accumulated on the capacitor 92. Accordingly, each pulse on conductor 74 resets the capacitor 92 and initiates a new charging cycle for the capacitor.

If the voltage accumulated on the capacitor attains a predetermined level intermediate any pair of pulses on conductor 74, it will cause a unijunction transistor 104 to conduct. The unijunction transistor 104 together with the resistors 106 and 108, the capacitor 92, and the constant current source including transistor 94 comprises a conventional relaxation oscillator providing periodic output pulses across the resistor 108. The output pulses across resistor 108 occur when the emitter-base-one circuit of the unijunction transistor 104 conducts in response to voltage on capacitor 92.

A third transistor 110 included in the oscillator circuitry is connected such that its base and emitter electrodes are connected across the resistor 108. A resistor 112 connects the collector of transistor 110 with the battery 102. Each pulse from the relaxation oscillator developed across resistor 108 biases transistor 110 conductive reducing the voltage at the collector of the transistor 110 substantially to ground potential. On the termination of conduction by unijunction transistor 104 and the concurrent termination of the voltage pulse across resistor 108, the voltage level at the collector of transistor 110 resumes a high level value related to the voltage of the battery 102.

In response to the rising edge of the voltage at the collector of transistor 110, a monostable multivibrator 114 provides an output pulse of a predetermined pulse width. It is noted that monostable multivibrator 114 is of conventional design and units adaptable to the circuit application are generally known and commercially available. The monostable multivibrator 114 provides a high value output pulse of a controlled pulse width in response to the rising edge of each input pulse connected with the input to the monostable multivibrator.

An emitter follower output stage comprising a transistor 116 and a resistor 118 provides an output from the oscillator 78. It should be appreciated that an output pulse train is provided which conforms to the pulse output from the monostable multivibrator 114 developed in the manner described above.

A conductor 82 connects the pulse output from the emitter follower with the summer 80 where it is combined with the pulse train from the adder 70 through resistor 119 on conductor 74, and the resultant pulse summation is available on the conductor 84 at the input to the sawtooth generator 86. It is noted that a direct connection is shown for effecting the summation of the pulse trains on conductors 74 and 82; in the alternative, diode connections could be used to accomplish the summation and maintain isolation between the two circuits.

The sawtooth generator 86 is reset by each pulse on the conductor 84. Conductor 84 is connected with the base electrode of a transistor 120; the transistor 120 having its collector and emitter electrodes connected across a capacitor 122. A resistor 124 connects the base and emitter electrodes of the transistor 120. A current source comprising the transistor 126, a source of direct voltage shown as a battery 128, and resistors 130 and 132 supplies charging current to the capacitor 122. The charging current has a level controllable in accordance with the output from the integrator connected with the base electrode and described below. An emitter follower output stage comprising two direct voltage bias sources shown as batteries 134 and 136, a resistor 138 and a transistor 140 provides an output signal from the sawtooth generator on conductor 142. This output signal has a sawtooth waveform characterized by a substantially constant maximum voltage independent of the frequency of sawtooth oscillations.

In operation, the current source connected with capacitor 122 provides charging current to develop a ramp voltage across the capacitor 122 which is available at the output on conductor 142. Each pulse on conductor 84 resets the capacitor 122 since each pulse biases transistor 120 conductive to discharge capacitor 122. In this manner, a sawtooth waveform is developed at the output of the generator 86 on conductor 142 having a frequency determined by the frequency of pulses on conductor 84. At low frequencies, the frequency is substantially that of the constant frequency oscillator 78; whereas at high frequencies when the pulses on conductor 84 are identically those on conductor 74, the frequency of sawtooth oscillations is the same as the frequency of pulses from the adder 70. During high frequency operation, where the frequency of sawtooth oscillations varies according to changes in the frequency of pulses on conductor 74, it is necessary to adjust the current level provided by the current source to ensure that the maximum voltage across capacitor 122 remains substantially constant.

To regulate the current level from the current source charging capacitor 122, an operational amplifier 144, connected in an integrator circuit, supplies a control signal to the base electrode of transistor 126 which in turn regulates the current level of the current source. A capacitor 146 and positive and negative bias provided to the operational amplifier 144 complete the necessary circuit connections to operate the operational amplifier as an integrator. The operational amplifier 144 is of a conventional design generally known and commercially available. The amplifier 144 has two inputs and its output is continuously adjusted by integrating the difference between the respective inputs. When the two inputs are equal, the output is maintained constant.

A control signal related to the desired average output from the sawtooth generator is developed by the battery 154 and the resistor 156 having a variable tap point for connection through resistor 158 with a first input to the operational amplifier 144. The sawtooth waveform developed at the output of the emitter follower across resistor 138 is filtered by a low-pass filter comprising resistors 160 and 162 and capacitors 164 and 166. This filtered measure of the sawtooth generator's output is connected with the second input to the operational amplifier 144.

It should be appreciated that the filtered DC indication of the sawtooth generator's output across resistor 138 is an indication of the maximum voltage level attained by the sawtooth waveform during each cycle. Accordingly, the adjustment in current level from the current source caused by the output from operational amplifier 144 will control the maximum voltage level and maintain it substantially constant throughout the operating range.

The sawtooth waveform on conductor 142 is connected with a voltage comparator 168. In addition, a reference source of direct voltage shown as a battery 170 is also connected to the voltage comparator 168. It is noted that the battery 170 provides open loop control of the duty cycle of the voltage comparator 168, whereas the block diagram of FIG. 3 shows a control scheme providing feedback control. As discussed below, the choice of control in a particular system would depend on system requirements. The comparator 168 is of conventional design, and it should be appreciated that units of the type required are generally known and commercially available. The operation of voltage comparator 168 is characterized by: a low level output when the two inputs have a first voltage relation, for example, a low level output could be provided when the sawtooth waveform on conductor 142 is less than the voltage from the battery 170; a high level output when the two inputs have a second voltage relation, for example, a high level output could be provided when the sawtooth waveform on conductor 142 is greater than the voltage from the battery 170. This output from the voltage comparator 168 is carried on a conductor 172. The remaining control features of the present invention will be described in conjunction with the block diagram of FIG. 3.

The output sawtooth waveform from the sawtooth generator 86 is depicted in the graphs of FIGS. 4A, 4B, and 4C and is there denoted 142 in agreement with the notation of FIGS. 3 and 5 where conductor 142 carries the output sawtooth waveform. It is noted that the sawtooth waveform is synchronized with the trigger signals 74 in a manner such that a new cycle of the sawtooth is initiated at the outset of each 60° increment during both low frequency and high frequency operation. At frequencies above the frequency of the pulse oscillator 78 (high frequency operation), a single sawtooth cycle is completed during each 60° of operation. On the other hand, at frequencies below the frequency of the pulse oscillator 78 (low frequency operation), the sawtooth generator completes more than one cycle in each 60° of operation. Thus, it should be appreciated that the oscillator 78 and sawtooth generator 86 comminute or fractionate the 60° intervals during low frequency operation. An integral number of sawtooth cycles or an integral number plus a fractional cycle may be completed for each 60° at low frequencies depending on the relationship of the time of 60° and the time of one sawtooth cycle. All this follows directly from the description of the sawtooth generator 86 set out above. It should be appreciated that the upper limit of low frequency operation can be set by adjusting the frequency of the oscillator 78. During the time in which the oscillator 78 provides output pulses, the frequency of the generator 86 is substantially the same as the frequency of the oscillator 78 as shown in the graphs of FIGS. 4A and 4B wherein one cycle of the sawtooth waveform is completed intermediate each pair of pulses from the oscillator 78. As shown in FIG. 4C, when the frequency of pulses from the adder 70 exceeds the fixed frequency of oscillator 78, the sawtooth waveform from the generator 86 has the same frequency as the pulses on conductor 74.

It is noted that the feedback control of sawtooth amplitude set out above in conjunction with FIG. 5 is merely one scheme of regulating the sawtooth voltage during high frequency operation. In the alternative, the requisite voltage adjustment could be readily accomplished by regulation wherein an increasing current, for charging capacitor 122 in FIG. 5, is developed by connections with a tachometer speed sensing device. When a tachometer is used, the current is maintained constant until the speed of operation exceeds a predetermined level. Above the preselected speed, the current is increased proportionately with the speed to maintain a constant voltage sawtooth waveform.

Reference should now be made to FIG. 3 which is used to complete the description of the control afforded by the present invention. The sawtooth signal on conductor 142 is applied to a voltage comparator 168 for comparison with a DC reference or control voltage. As noted above, the comparator 168 provides a two state output on the conductor 172. The two inputs to the comparator are connected with conductors 142 and 174 in a manner such that the output from the comparator 168 is at its low level when the sawtooth voltage has an instantaneous level less than the level of the reference DC voltage connected to the comparator and the output is at its high level when the sawtooth voltage has an instantaneous level higher than the level of the reference DC voltage. This output on conductor 172 is depicted in the three graphs of FIGS. 4A, 4B, and 4C and is there denoted 172.

In FIG. 3, a connection is made from conductor 172 to a low pass filter 176 which senses the output from the voltage comparator 168. The filter averages the output on conductor 172 and develops a DC indication thereof. In operation, it should be appreciated that the level of the DC is an indication of the relationship between the time in which comparator 168 provides its high level output and the time during which it provides its low level output.

This DC signal from the low-pass filter 176 which is proportional to the duty cycle of the comparator 168 is applied to one input of an integrator 178. The integrator 178 has a second input connected with a source of direct voltage 180. The source of direct voltage 180 can take a variety of known forms including a regulated full wave rectified DC source or simply a battery. The integrator 178 is of conventional design generally known in the art and is neither illustrated nor discussed in detail. One circuit suitable for inclusion in the circuit to perform the function of this integrator comprises a differential amplifier connected to perform the requisite integration. In operation, the output of the amplifier is an integration of the difference between the input signals from the source of direct voltage 180 and the low-pass filter 178. Accordingly, the system, by means of this feedback loop, makes continuous adjustments until the DC level from the filter 176 is the same as the DC level from the source of direct voltage 180.

As an alternative to the feedback control shown in FIG. 3, a direct connection from a reference DC voltage source could be made to the voltage comparator 168. This direct connection (open loop) means of control is shown in FIG. 5 and was discussed above in conjunction with that figure. The battery 170 of FIG. 5 provides the open loop control, and it should be noted by comparison that the feedback loop of FIG. 3 comprising the filter 176 and the integrator 178 is eliminated by using open loop control. Performance requirements during operation would determine the preferred circuit arrangement.

In either control scheme, the DC source (source of direct voltage 180 in FIG. 3 or battery 170 in FIG. 5) connected in the control affords automatic or operator control of the duty cycle of the voltage comparator 168. By adjusting the level of the DC source, the duty cycle is modified, and the voltage the converter supplies the motor is regulated as more fully described below. It is noted that manual or automatic control of the DC level can be provided according to the system requirements.

Continuing the description of the drawing of FIG. 3, the adder 70 is also connected directly with a logic network 182 to control the timing of the sequential and periodic application of trigger signals to the various full wave bridge networks of FIG. 1. In FIG. 3, the A+ bridge trigger for controlled rectifiers 36A and 38A is the only trigger output shown. In accordance with the summary of the triggering system set forth above, it should be appreciated that six connections are required for the gate-cathode circuits of the controlled rectifiers 36A and 38A to control their gating. It is noted that the logic 182 is connected with similar trigger control circuitry (not illustrated) for each of the remaining five bridge rectifier networks. This triggering system is disclosed and discussed in detail, as noted above, in copending application, Ser. No. 57,143.

A three-input AND gate 84 has two inputs connected with the logic 182 by conductors 186 and 188 and its third input connected with the conductor 172. In this manner, the AND gate is controlled according to the three signals connected with its inputs. The AND gate 184 is of conventional design generally known in the art and commercially available. Its operation is such that it provides a low output level signal until and unless all three inputs connected with it are at a high level. When the three inputs connected with the AND gate 184 are simultaneously at their high level, the AND gate provides a high level output and the transistor 190 is biased conductive. It should be appreciated that the logic 182 disables the AND gate except during the intervals shown in the graph of FIG. 2 and there denoted A+. Additionally, the third input to the AND gate from the conductor 172 effects pulse modulation during the interval A+ of the graph of FIG. 2. Accordingly, transistor 190 is cycled conductive and nonconductive depending on the output level available from the AND gate 184. This pulse modulation is shown in the graphs of FIGS. 4A, 4B, and 4C.

It should be understood that the description directed to the development of trigger signal A+ is analogous to that which applies to the remaining five trigger outputs (not illustrated) required for the FIG. 1 converter arrangement. The generation of trigger signal A+ is accomplished according to the summary set out above and by way of reiteration, it is noted that the square wave oscillator or chopper 192 connected with transistor 190 energizes the primary winding of a transformer which in turn excites six secondary windings to develop six signals for controlled rectifiers 36A and 38A. The trigger circuitry 194 encompasses the transformers and rectifier circuitry required as well as six trigger circuits. Again, this is duplicated five times to accommodate the remaining five full wave bridge rectifiers. Of course, the timing of the remaining trigger circuits is different from that shown for the A+ triggers. Essentially, the remaining controlled rectifiers are supplied gate turn-on pulses during the respective times depicted for the one cycle of operation in the graph of FIG. 2 with modulation similar to that shown for the A+ triggers in FIGS. 4A, 4B, and 4C.

Reference should now be made to FIGS. 4A, 4B, and 4C wherein the effect of the duty cycle modulation of this invention is graphically summarized for the A+ trigger outputs. It should be appreciated, as noted above, that the A+ output shown in the graphs is applied to all six controlled rectifiers 36A and 38A. The remaining five bridge networks are modulated in an analogous fashion during their respective conductive intervals. In the three figures, the frequency of pulse train 74 has a varying ratio to the pulse train frequency for signal 82. FIG. 4A depicts the situation at low motor frequency and the A+ trigger is shown for a single 120° interval. FIG. 4B shows the operation at an intermediate frequency, and FIG. 4C summarizes the operation at high frequency.

As shown in FIG. 4A, the sawtooth waveform 142 begins a new cycle on the occurrence of each pulse of the pulse train 84. The DC reference $V_{DC}$ (174) from the integrator 178 of FIG. 3 is shown superposed on the sawtooth waveform 142, and the output waveform 172 from the voltage comparator 168 is at its high state when the sawtooth voltage 142 exceeds the DC reference $V_{DC}$ and is at its low state when the sawtooth 142 is less than the DC reference $V_{DC}$. Trigger signals for the A+ bridge rectifier are constrained to occur in the zero to 120° time interval as a consequence of the control provided by the logic 182 to AND gate 184 with the additional constraint imposed that A+ triggers are present in this interval only when waveform 172 is at its high state. With these factors in mind, the A+ trigger depicted in FIG. 4A follows.

FIG. 4B shows a second operating frequency somewhat higher than that of FIG. 4A. Accordingly, the frequency of the fixed frequency oscillator 78 generating pulse train 82 is closer to the frequency from the adder from line 74. Each pulse in the pulse train 84 resets the sawtooth generator 86, and accordingly, the sawtooth waveform 142 has the waveform shown in the figure. It is noted that the sawtooth waveform 142 completes slightly more than one cycle during each 60° time increment. The waveform 172 is at its high level when the sawtooth 142 has an instantaneous voltage in excess of the reference voltage $V_{DC}$. As was the case for FIG. 4A, the A+ trigger is present only during those time intervals from zero to 120° with the additional constraint that it is inhibited when the waveform 142 is at its low level.

In FIG. 4C, the frequency of adder 70 exceeds the frequency of the fixed frequency oscillator 78, and the pulse train 82 is eliminated. Accordingly, as noted above, pulse train 84 is identical to pulse train 74, and the sawtooth waveform 142 has the same frequency as pulse train 74 completing a single cycle in each 60°. The waveform 172 has a high level when the sawtooth voltage of waveform 142 exceeds the reference $V_{DC}$, and the A+ trigger comprises a single pulse for each 60° of motor operation as shown in the figure.

Waveform 172 is connected with the trigger logic for each of the six bridge rectifier networks. Accordingly, each is constrained by the pulse modulation control such that it is conductive only when the waveform 172 is at its high level. In addition, each of the bridge rectifier networks is controlled by the logic 182 as described above.

It should be understood from the foregoing that the voltage supplied the motor by the converter is controlled by regulating the voltage $V_{DC}$ shown in the graphs superposed on the sawtooth waveform 142. For example, if the voltage from the source of direct voltage 180 of FIG. 3 is increased, the A+ trigger shown in FIGS. 4A, 4B, and 4C will reduce the length of trigger pulses applied to controlled rectifiers 36A and 38A to reduce the voltage supplied the motor. Similarly, if the voltage from the source of direct voltage 180 is decreased, the voltage supplied the motor will increase.

The present invention affords two modes of pulse modulation to control the power level supplied to the AC induction motor. The first mode, associated with low frequency operation, uses an auxiliary oscillator to increase the modulation frequency above that associated with normal 60° modulation. The second or high frequency mode of operation relies exclusively on 60° modulation to regulate the voltage level. Trigger signals to various bridge rectifiers are inhibited during each cycle of modulation and smooth transition is effected as the number of cycles of modulation decreases continuously with increasing motor frequency until the high frequency mode is reached.

Although this invention has been described in terms of a preferred embodiment, it should be appreciated that various changes and modifications could be engrafted upon the example by one skilled in the art within the scope of the claims appended hereto. Particularly, it should be borne in mind that inverters providing an AC output from a DC input as well as cycloconverters providing an AC output from an AC input can use the regulation scheme of this invention including voltage control conduction periods and frequency control conduction periods as described above. Additionally, it should be understood that the controlled switches of the converter can be controlled rectifiers, transistors or other controllable switching devices.

We claim:

1. A power supply system for supplying a variable frequency alternating voltage having a variable voltage magnitude to an electrical load, comprising: a source of power, converter means including a plurality of controllable switching devices connected between said source of power and said electrical load for controlling both the magnitude and frequency of the alternating voltage applied to said electrical load from said converter means, variable frequency control means coupled to said switching devices for causing predetermined switching devices to be conductive during predetermined frequency determining conduction periods to thereby determine the frequency of the alternating voltage applied to said electrical load, voltage control means coupled to said switching devices for causing said predetermined switching devices to be conductive and nonconductive during a given frequency determining conduction period to define a plurality of voltage control conduction periods within said given frequency determining conduction period to control the magnitude of alternating voltage applied to said load, a constant frequency pulse generator and means for initiating and terminating the operation of said pulse generator as a function of the output of said variable frequency control means whereby, said pulse generator initiates a cycle at the outset of each frequency determining conduction period and produces a number of pulses determined by the integral number of cycles completed by said pulse generator during the frequency determining conduction period and whereby, said pulse generator produces no output pulses when the frequency of said frequency control means exceeds the frequency of said pulse generator, means coupling the output of said pulse generator and the output of said frequency control means to said voltage control means to determine the number of voltage control conduction periods whereby, the number of voltage control conduction periods when the frequency of said variable frequency control means is less than the frequency of said pulse generator is equal to or one greater than the number of pulses provided by said pulse generator during a given frequency determining conduction period and whereby, a single voltage control conduction period is provided within a given frequency determining conduction period when the frequency of said variable frequency control means is greater than the frequency of said pulse generator, and means for controlling the percentage on-time for said switching devices during each of said voltage control conduction periods.

2. A power supply system for supplying a variable frequency alternating voltage having a variable voltage magnitude to an alternating current motor having a winding, comprising: a source of power, converter means including a plurality of controllable switching devices connected between said source of power and said motor winding for controlling the frequency and voltage magnitude of the alternating voltage applied to said motor winding from said converter means, variable frequency control means coupled to said switching devices for causing predetermined switching devices to be conductive during predetermined frequency determining conduction periods to thereby determine the frequency of the alternating voltage applied to said motor winding, voltage control means coupled to said switching devices for causing said predetermined switching devices to be conductive and nonconductive during a given frequency determining conduction period to thereby define a plurality of voltage control conduction periods within a frequency determining conduction period to control the magnitude of alternating voltage applied to said motor winding, a constant frequency pulse generator, means for initiating and terminating the operation of said pulse generator as a function of the frequency of said variable frequency control means whereby, said pulse generator produces a predetermined number of pulses during a given frequency determining conduction period and produces no output pulses when the frequency of said variable frequency control means exceeds the operating frequency of said pulse generator, means coupling the output of said pulse generator and the output of said variable frequency control means to said voltage control means whereby, the number of voltage control conduction periods within each frequency determining conduction period is a function of the operating frequency of said pulse generator when the frequency of said pulse generator is greater than the frequency of said variable frequency control means and is a function of the operating frequency of said variable frequency control means when the frequency of said pulse generator is less than the frequency of said variable frequency control means, and means for controlling the pulse width of voltage pulses supplied said motor winding during said voltage control conduction periods.

3. A power supply system for an alternating current motor having a winding, comprising: a source of voltage, converter means including a plurality of controllable switching devices connected between said source of voltage and said motor winding, means coupled to said converter means for controlling the switching frequency of said switching devices such that an alternating current of a predetermined controllable frequency is applied to said motor winding from said converter means, a variable frequency ramp voltage generating means for developing a series of ramp voltages at a controllable frequency, a source of direct controllable voltage, comparator means coupled to said switching devices, to said source of direct control voltage and to said ramp voltage generating means for controlling the conduction periods of said switching devices to thereby control the voltage applied to said motor winding, and control means controlled as a function of the switching frequency of said converter and coupled to said ramp voltage generating means for causing said ramp voltage generating means to operate at a higher frequency than the switching frequency of said converter when said switching frequency is below a predetermined value and for operating said ramp voltage generating means substantially at the switching frequency of said converter means when said switching frequency is above a predetermined value.

4. An AC motor control system, comprising: a power supply, a controlled rectifier converter, an AC motor, means connecting said power supply to the input of said converter, means connecting said AC motor to the output of said converter, a source of control signals connected with the controlled rectifiers of said converter to control the frequency of power supplied said AC motor, said source of control signals generating switching signals at a controllable predetermined frequency to afford continuous control of the frequency of power supplied said AC motor, a constant frequency oscillator, a constant amplitude variable frequency sawtooth wave generator, means coupling said source of control signals and said constant frequency oscillator with said sawtooth generator, said oscillator and said source of control signals being so connected with said sawtooth generator that said sawtooth generator operates at the frequency of said switching signals when the frequency of said switching signals exceeds the frequency of said constant frequency oscillator and operates substantially at the frequency of said constant frequency oscillator when the frequency of said switching signals is less than the frequency of said constant frequency oscillator, a variable amplitude DC reference source, means connected with both said sawtooth generator and said DC reference source for comparing the voltage magnitude of said DC reference source with the instantaneous voltage magnitude from said sawtooth generator, and a control means connected with the controlled rectifiers of said converter and with said comparing means to inhibit conduction by said controlled rectifiers when the DC reference voltage has a first predetermined relation to the voltage of said sawtooth generator and to permit conduction by said controlled rectifiers when the DC reference voltage has a second predetermined relation to the voltage of said sawtooth generator whereby, a variable duty cycle is effected to regulate the power level available to said AC motor.

5. An AC motor control system, comprising: an alternating voltage power supply, a controlled rectifier converter, an AC motor, means connecting said alternating voltage power supply to the input of said converter, means connecting said AC motor to the output of said converter, a source of gating signals connected with the controlled rectifiers of said converter to control the frequency of power supplied said AC motor, a control means included in said source of gating signals to effect control of gating signals to the respective controlled rectifiers, said source of gating signals generating switching signals at a controllable predetermined frequency to afford continuous control of the frequency of power supplied said AC motor, a constant frequency pulse generator, a constant amplitude variable frequency sawtooth wave generator, means coupling said source of gating signals and said constant frequency pulse generator with said sawtooth generator, said sawtooth generator operating at the frequency of said switching signals when the frequency of said switching signals exceeds the frequency of said constant frequency pulse generator, said sawtooth generator operating substantially at the frequency of said constant frequency pulse generator when the frequency of said switching signals is less than the frequency of said constant frequency pulse generator, a variable amplitude DC reference source, means connected with both said sawtooth generator and said DC reference source for comparing the voltage magnitude of said DC reference source with the instantaneous magnitude from said sawtooth generator, and means connecting said control means with said comparing means to inhibit or enable the application of switching signals by said source of gating signals to preclude conduction by the controlled rectifiers of said converter when the DC reference voltage has a magnitude larger than the instantaneous magnitude of the voltage of said sawtooth generator and to permit conduction by the controlled rectifiers of said converter when the DC reference voltage has a magnitude less than the instantaneous magnitude of the voltage of said sawtooth generator whereby, a variable duty cycle is effected to regulate the power level available to said AC motor.

6. The motor control system according to claim 5 where the source of gating signals gates the controlled rectifiers such that substantially rectangular voltage pulses are applied to said motor from said converter.

7. A motor control system for a polyphase induction motor having a polyphase winding and a squirrel cage rotor, comprising: a source of power, a switching circuit comprising a plurality of controllable switching devices connected between said source of power and said winding for controlling both the magnitude and frequency of the alternating voltage applied to said motor from said switching circuit, variable frequency control means coupled to said switching devices for causing predetermined switching devices to be conductive during predetermined frequency determining conduction periods to thereby determine the frequency of the alternating voltage applied to said motor winding, voltage control means coupled to said switching devices for causing said predetermined switching devices to be conductive and nonconductive during a given frequency determining conduction period to define a plurality of voltage control conduction periods within said given frequency determining conduction period to control the magnitude of alternating voltage applied to said motor winding, said voltage control means including means for determining the number of voltage control conduction periods that occur during a given frequency determining conduction period and for decreasing the number of voltage control conduction periods that occur in a given frequency determining conduction period as the switching frequency of said switching circuit increases when the switching frequency of said switching circuit is below a predetermined value, said voltage control means including means for causing one voltage control conduction period to occur during each frequency determining conduction period when the switching frequency of said switching circuit is above said predetermined value whereby, a smooth continuous transition occurs in the number of voltage control conduction periods as the switching frequency of said switching circuit varies, and variable control means for controlling the pulse width of voltage pulses supplied said winding during said voltage control conduction periods whereby, the average voltage applied to said motor winding can be controlled to thereby provide a system wherein both the average voltage and frequency of the alternating voltage applied to said induction motor is controllable.

8. The motor control system according to claim 7 where the variable frequency control means includes means for controlling the slip frequency of said induction motor.

9. A vehicle propulsion system, comprising: an AC induction motor having a winding and a squirrel cage rotor, means coupling said rotor to a vehicle wheel, an alternating current generator, a prime mover mechanically coupled to said generator for driving said generator, a controlled rectifier converter connected between said generator and said motor winding for controlling both the magnitude and frequency of the alternating voltage supplied to said motor winding from said converter, a source of control signals connected with the controlled rectifiers of said converter to control the frequency of power supplied said motor winding, said source of control signals generating switching signals at a controllable predetermined frequency to afford continuous control of the frequency of power supplied said AC motor, a constant frequency oscillator, a constant amplitude variable frequency sawtooth wave generator, means coupling said source of control signals and said constant frequency oscillator with said sawtooth generator, said oscillator and said source of control signals being so connected with said sawtooth generator that said sawtooth generator operates at the frequency of said switching signals when the frequency of said switching signals exceeds the frequency of said constant frequency oscillator and operates substantially at the frequency of said constant frequency oscillator when the frequency of said switching means is less than the frequency of said constant frequency oscillator, a variable amplitude DC reference source, means connected with both said sawtooth generator and said DC reference source for comparing the voltage magnitude of said DC reference source with the instantaneous voltage magnitude from said sawtooth generator, and a control means connected with the controlled rectifiers of said converter and with said comparing means to inhibit conduction by said controlled rectifiers when the DC reference voltage has a first predetermined relation to the voltage of said sawtooth generator and to permit conduction by said controlled rectifiers when the DC reference voltage has a second predetermined relation to the voltage of said sawtooth generator whereby, a variable duty cycle is effected to regulate the power level available to said AC motor.

* * * * *